United States Patent
Ichihara (10) Patent No.: US 10,629,922 B2
(45) Date of Patent: Apr. 21, 2020

(54) FUEL CELL STACK (71) Applicant: NISSAN MOTOR CO., LTD., Yokohama-shi, Kanagawa (JP)

(72) Inventor: Keiji Ichihara, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 16/317,166

(22) PCT Filed: Jul. 14, 2016

(86) PCT No.: PCT/JP2016/070860
§ 371 (c)(1),
(2) Date: Jan. 11, 2019

(87) PCT Pub. No.: WO2018/011948
PCT Pub. Date: Jan. 18, 2018

(65) Prior Publication Data
US 2019/0296371 A1 Sep. 26, 2019

(51) Int. Cl.
*H01M 8/0273* (2016.01)
*H01M 8/2483* (2016.01)
(Continued)

(52) U.S. Cl.
CPC ......... *H01M 8/0273* (2013.01); *H01M 8/026* (2013.01); *H01M 8/0247* (2013.01);
(Continued)

(58) Field of Classification Search
None
See application file for complete search history.

(56) References Cited

U.S. PATENT DOCUMENTS

2012/0156584 A1 6/2012 Uehara
2013/0071769 A1 3/2013 Ikezoe et al.
(Continued)

FOREIGN PATENT DOCUMENTS

EP 3 026 741 A1 6/2016
JP 2006-019204 A 1/2006
(Continued)

*Primary Examiner* — Wyatt P McConnell
(74) *Attorney, Agent, or Firm* — Foley & Lardner LLP (57) ABSTRACT

A fuel cell stack FS, in which cell structures 3, each of which includes a frame 2 that is disposed at the periphery of the cell structure 3; and separators 4 that are alternately stacked, includes a sealing member S between a peripheral portion of a frame 2 of a first cell structure 3 on one side of one of the separators and a peripheral portion of the separator 4. In each of the separators 4, a first contacting portion 11 in contact with the sealing member S, second contacting portions 12 in contact with a frame 2 of a second cell structure 3 on the other side thereof, and connecting portions 13 that connect the first contacting portion 11 and the second contacting portions 12 are included so as to form a protruded shape portion. Each of the second contacting portions 12 includes a fixing portion fixing with the frame. According to the above, the displacement of the separator 4 attributable to a load caused by pressure difference or thermal deformation is prevented so that the sealing function is maintained.

8 Claims, 6 Drawing Sheets (51) Int. Cl.
*H01M 8/0247* (2016.01)
*H01M 8/026* (2016.01)
*H01M 8/0297* (2016.01)
*H01M 8/249* (2016.01)
*H01M 8/0271* (2016.01)
*H01M 8/0206* (2016.01)
*H01M 8/0282* (2016.01)

(52) U.S. Cl.
CPC ....... *H01M 8/0271* (2013.01); *H01M 8/0297* (2013.01); *H01M 8/249* (2013.01); *H01M 8/2483* (2016.02); *H01M 8/0206* (2013.01); *H01M 8/0282* (2013.01)

(56) References Cited

U.S. PATENT DOCUMENTS

| | | |
|---|---|---|
| 2014/0227622 A1 | 8/2014 | Nishiyama et al. |
| 2015/0295266 A1 | 10/2015 | Nonoyama |
| 2016/0111746 A1 | 4/2016 | Uehara |
| 2017/0263952 A1* | 9/2017 | Terada ................ H01M 8/0273 |
| 2017/0324099 A1* | 11/2017 | Stoehr .................... C25B 9/203 |

FOREIGN PATENT DOCUMENTS

| | | |
|---|---|---|
| JP | 2007-018958 A | 1/2007 |
| JP | 2009-230876 A | 10/2009 |
| JP | 2013-251253 A | 12/2013 |
| JP | 2015-109225 A | 6/2015 |
| WO | WO-2011/114811 A1 | 6/2013 |

* cited by examiner

FUEL CELL STACK

TECHNICAL FIELD

The present invention relates to an improved version of a fuel cell stack in which cell structures, each including a solid electrolyte intervened between a fuel electrode and an air electrode, and separators are alternately stacked.

BACKGROUND ART

One of conventional fuel cell stacks is described in Patent Document 1, which is titled sealing structure of fuel cell. The fuel cell stack in Patent Document 1 includes a plurality of cells stacked. Each of the cells includes a cell plate, an anode current collector, a cell frame and a separator. In a pair of cells adjacent in the stacking direction of the fuel cell stack, the cell frame of one cell of the pair of cells has a sealing groove while the separator of the other cell of the pair of cells has a protrusion corresponding to the sealing groove. In the fuel cell stack, a sealing member for sealing a gas channel is disposed between the sealing groove and the protrusion. The sealing member softens in the range of operation temperature of the fuel cell.

CITATION LIST

Patent Document

Patent Document 1: JP 2015-109225A

SUMMARY OF INVENTION

Technical Problem

In the conventional fuel cell stacks as described above, when the separator is subjected to pressure difference between the anode side and the cathode side or thermally deformed, the protrusion of the separator is also deformed to directly apply a tensile force in the stacking direction or a shear force in the perpendicular direction to the stacking direction. Therefore, a problem with the conventional fuel cell stacks is the decreased durability of the sealing members, and it has been required to solve the problem.

The present invention has been made in view of the above-described problem in the prior art, and an object thereof is to provide a fuel cell stack that can maintain its sealing function by preventing deformation of separators even when the separators are subjected to a load in the in-plane direction caused by pressure difference between the anode side and the cathode side or thermal deformation.

Solution to Problem

The fuel cell stack of the present invention includes cell structures, each including a power generation area, and a frame disposed around the power generation area; and separators, in which the cell structures and the separators are alternately stacked. The fuel cell stack further includes a sealing member that seals a gap between a peripheral portion of a frame of a first cell structure on one side of one of the separators among the cell structures and a peripheral portion of the one of the separator.

Further, in the fuel cell stack, each of the separators includes: a first contacting portion in contact with the sealing member; second contacting portions in contact with a frame of a second cell structure on the other side of the separator among the cell structures at both sides of the first contacting portion and; and connecting portions that connect one and the other ends of the first contacting portion and each of the second contacting portions, respectively. The separator thus includes a protruded shape portion in a protruded shape with a top side composed of the first contacting portion in a cross section transverse to the sealing member. Each of the second contacting portions includes a fixing portion that fixes the second contacting portion and the frame of the second cell structure.

Advantageous Effects of Invention

In the fuel cell stack of the present invention having the above-described configuration, the protruded shape portion, which is formed the first contacting portion, the connecting portions at both sides and the second contacting portions with the fixing portions at both sides of the first contacting portions, maintains in the protruded shape between frames of adjacent cell structures so as to prevent the sealing member from being directly subjected to a tensile force in the stacking direction or a shear force in the direction perpendicular to the stacking direction. Therefore, the fuel cell stack can maintain the sealing function even when a separator is subjected to a load in the in-plane direction that is caused by pressure difference between the anode side and the cathode side or thermal deformation, since deformation of the separator due to the load is prevented.

DESCRIPTION OF EMBODIMENTS

First Embodiment

Figure 1:
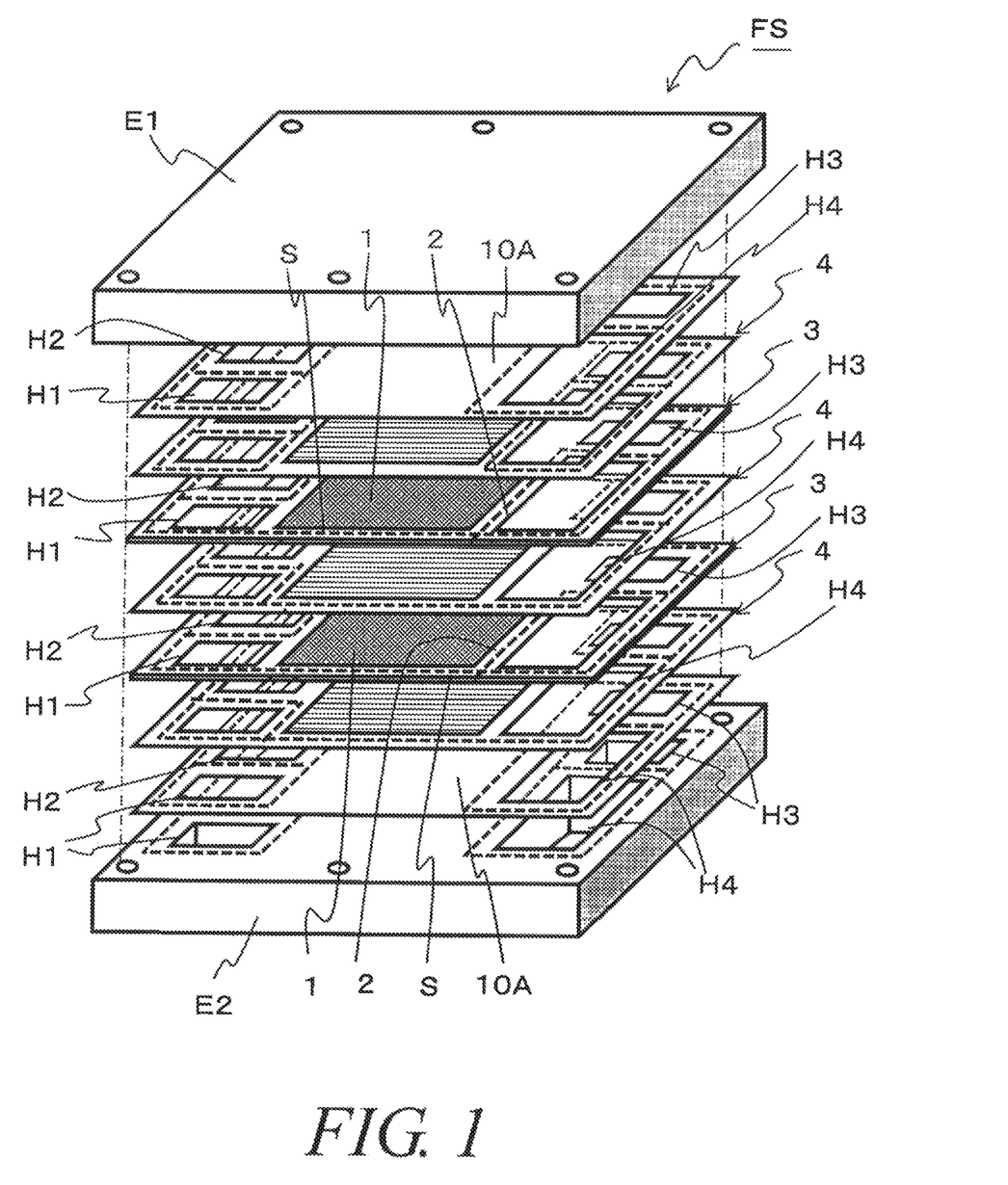
FIG. 1 is an exploded perspective view of a fuel cell stack according to a first embodiment of the present invention.

FIG. 1 is a schematic view of an embodiment of the fuel cell stack of the present invention. In the fuel cell stack FS illustrated, cell structures 3, each of which includes a power generation area 1 and a cell frame 2 around the power generation area 1, and separators 4 are alternately stacked.

Figure 2:
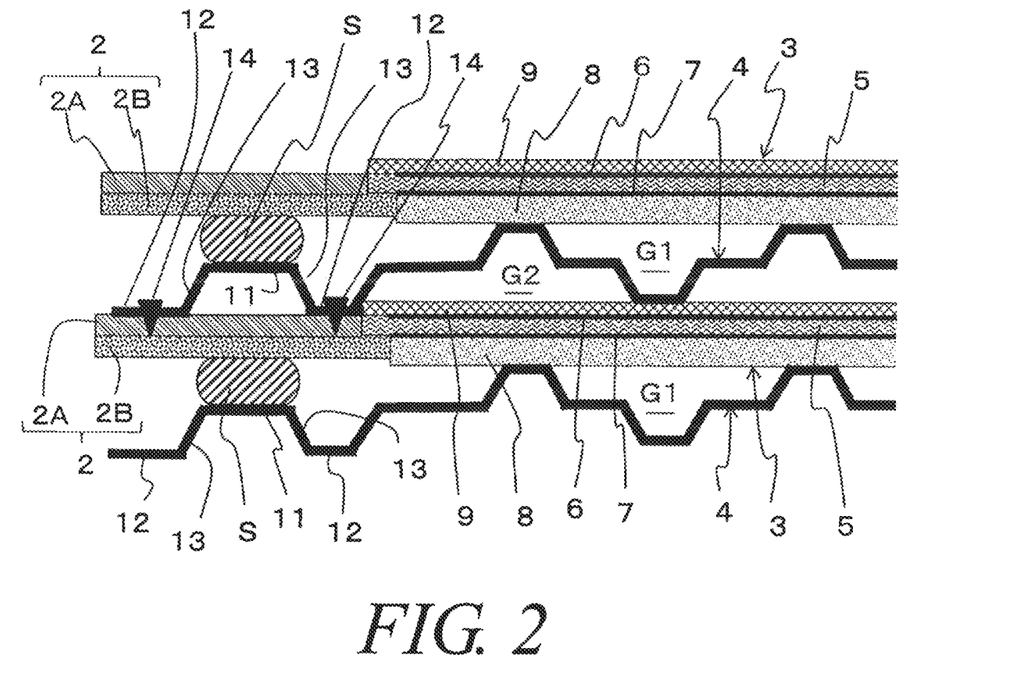
FIG. 2 is a cross-sectional view of a peripheral portion of the fuel cell stack in FIG. 1.

Each of the cell structures 3, which is a multi-layered structure having a rectangular flat plate shape, includes an air electrode 6 on one side (upper side in FIG. 2) of a solid electrolyte 5 and a fuel electrode 7 on the other side as partly illustrated in FIG. 2. The cell structure 3 further includes a supporting plate 8 of a porous material such as porous metal on the side of the fuel electrode 7. The cell structure 3, which includes the supporting plate 8 for improving the mechanical strength while maintaining the gas permeability for the fuel electrode 7, is also referred to as, for example, a metal-supported cell.

The cell structure 3 of this embodiment includes a reinforcing plate 9 at the side of the air electrode 6, which is made of a gas-permeable material such as expanded metal or metal mesh. The reinforcing plate 9 further improves the mechanical strength while maintaining the gas permeability for the air electrode 6. Further, the cell structure 3 includes a first metal frame 2A integrally disposed around the electrolyte 5, the fuel electrode 6 and the air electrode 7, and a second frame 2B integrally disposed around the supporting plate 8. The second frame corresponds to a compressed dense peripheral portion of the porous supporting plate 8.

In the cell structure 3, the center portion where the electrolyte 5, the air electrode 6 and the fuel electrode 7 are disposed corresponds to the power generation area 1, and a frame 2 composed of the first and second frames 2A, 2B is disposed around the power generation area 1.

Each of the separators 4, which is made of a metal material such as stainless steel, is a rectangular plate that corresponds to the cell structure 3 and has front and back sides with mutually inverted uneven patterns formed by press working. Each separator 4 is intervened between adjacent cell structures 3, 3 to form a gas channel G1 for fuel gas (hydrogen-containing gas or hydrogen gas) between the separator 4 and a first cell structure 3 of the adjacent cell structures 3, 3, that is an upper cell structure in FIG. 2, and a gas channel G2 for air (oxidant gas) between the separator 4 and a second cell structure 3 of the adjacent cell structures 3, 3.

The frames 2 of the cell structures 3 and the separators 4 each have a manifold hole H1 for supplying fuel gas and a manifold hole H2 for discharging air at one short side. Further, they each have a manifold hole H3 for discharging fuel gas and a manifold hole H4 for supplying air at the other short side. When the cell structures 3 and the separators 4 are stacked, the manifold holes H1 to 114 communicate with each other to form respective manifolds in which fuel gas or air flows.

In the fuel cell stack FS, the cell structures 3 and the separators 4 are alternately stacked as illustrated in FIG. 1, and end plates E1, E2 are disposed on the upper and lower ends of the stack via current collector plates 10A, 10B. In the fuel cell stack FS, the end plates E1, E2 at respective ends are coupled to each other by bolts and nuts to restrain the stack. When coupling the end plates E1, E2, a spring may be disposed to apply a stacking load according to need.

While FIG. 1 illustrates two cell structures 3, a larger number of cell structures 3 are actually stacked. Further, the number of separators 4 is by one larger than the number of cell structure 3 so that the gas channels G1, G2 are formed on opposite sides of each of the cell structures 3. The current collector plates 10A, 0B and one of the end plates (end plate E2) have the same manifold holes H1 to H4 as those of the cell structures 3.

The fuel cell stack FS includes sealing members S that are disposed between the components, which are illustrated by dashed lines in FIG. 1. The sealing members S are mainly disposed between peripheral portions of the cell structures 3 and those of the separators 4 and around the manifold holes H1 to H4.

Between the peripheral portions of the cell structures 3 and those of the separators 4, the sealing members S are disposed in an endless shape along the entire periphery so as to airtightly seal the gas channels G1, G2. Around the manifold holes H1 to H4, the sealing members S are at least partly open so that fuel gas or air can flow to the gas channels G1, G2, but the sealing members S seal the other parts to airtightly separate respective flow areas of fuel gas and air.

That is, as illustrated in FIG. 2, the fuel cell stack FS includes a sealing member S that seals a gap between a peripheral portion of a frame 2 (2B) of a first cell structure 3 of the cell structures 3, 3 disposed on both sides of the separator 4 and a peripheral portion of the separator 4.

The material of the sealing members S is not particularly limited. However, it is desirable that the sealing members S are made of a glass material such as low-crystalline glass, which has a bonding function and an electrically insulating function between the components as well as the gas sealing function. In the following description, the upper cell structure 3 in FIG. 2 is referred to as a first cell structure 3, and the lower cell structure 3 is referred to as a second cell structure 3.

Figure 3:
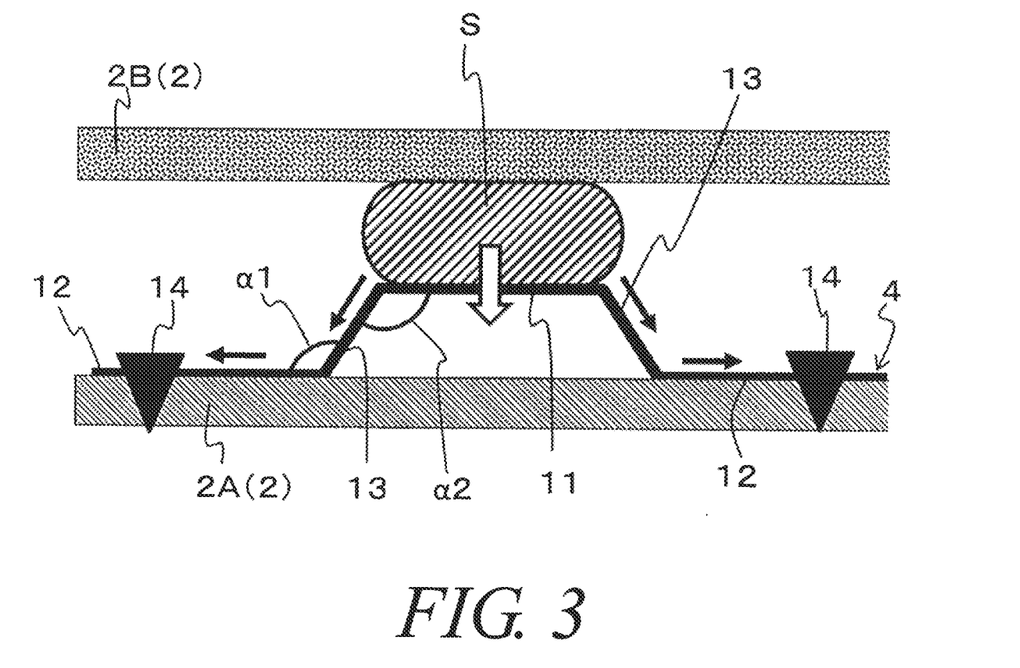
FIG. 3 is a cross-sectional view illustrating transmission of a force that is produced around a sealing member.

In the fuel cell stack FS, as shown in a cross section transverse to the sealing member S of each FIG. 2 and FIG. 3, as each of the separators 4 includes a first contacting portion 11, second contacting portions 12 at both sides of the first contacting portion 11 and connecting portions 13 similarly at both sides, a protruded shape portion in a protruded shape including a top side composed of the first contacting portion 11 is formed. The protruded shape portion composed of the portions 11 to 13 has a shape such that a cross-sectional shape of the protruded shape portion extends along the sealing member S (in the direction perpendicular to the sheet of FIG. 2 or FIG. 3).

The first contacting portion 11 is a flat portion in contact with the sealing member S, and the sealing member S is held between the first contacting portion 11 and the frame 2 (second frame 2B) of a first cell structure 3. The second contacting portions 12 are flat portions in contact with the frame 2 (first frame) of a second cell structure 3, which are at both sides of the first contacting portion 11. The second contacting portions 12 include respective fixing portions 14 that are fixed to the frame 2. The fixing portions 14 of the embodiment correspond to welded portions to the frame 2.

The connecting portions 13 are provided to connect the ends of the first contacting portion 11 to the second contacting portions 12, 12. In each of the separators 4, a protruded shape portion on the frame 2 that includes the first contacting portion 11 as the top side (upper base) and the connecting portions 13, 13 as the legs has a trapezoidal shape in a cross section transverse to the sealing member S.

In the separator 4 of the embodiment, the angles α1 between the respective second contacting portions 12, 12 and the connecting portions 13, 13 have a measure of greater than 90 degrees. Further, in the separator 4, the angles α1 between the respective second contacting portions 12, 12 and the connecting portions 13, 13 have the same measure in degree.

In the separator 4, the first and second contacting portions 11, 12 are (substantially) parallel to each other. Accordingly, the angles α2 between the first contacting portion 11 and each of the connecting portions 13, of course, have a measure of greater than 90 degrees, and the angles α2 have the same measure in degree between both sides of the first connecting portion 11. The angles α1, α2 are not specifically limited. However, when the angles α1, α2 have a measure of greater than 90 degrees, it is desirable that they are within the range that allows adequately converting and transmitting a downward force acting on the first contacting portion 11 into a force in the in-plane direction acting on the second contacting portions 12.

The fuel cell stack FS having the above-described configuration generates electric energy by electrochemical reaction at the power generation area 1 of the cell structure 3 when air and fuel gas are introduced to the gas channels G1, G2 and supplied respectively to the air electrode 6 and the fuel electrode 7.

During operation of the fuel cell stack FS, the separator 4 is subjected to a load that is caused by pressure difference between the anode side and the cathode side or thermal deformation in the in-plane direction (direction parallel to the surface). To cope with the load, in the fuel cell stack FS, the first contacting portion 11, the connecting portions 13, 13 and the second contacting portions 12, 12 with the fixing portions 14 of each separator 4 maintain the protruded shape between the frames 2, 2 of adjacent cell structures 3, 3. That is, in the fuel cell stack FS, the protruded shape of each protruded shape portion of the separators 4 bears the load between adjacent cell structures 3, 3.

To be more specific, in the fuel cell stack FS, when a force in the compressing direction is produced in an interlayer as illustrated by the bold arrow in FIG. 3, the force is transmitted along the connecting portions 13 into the direction along the second contacting portions 12 as illustrated by the thin arrows. In the fuel cell stack FS, since the second contacting portions 12, 12 are fixed on the frame 2 by the respective fixing portions 14, 14, the protruded shape of each protruded shape portion is maintained even when a force in the compressing direction is applied.

Figure 4:
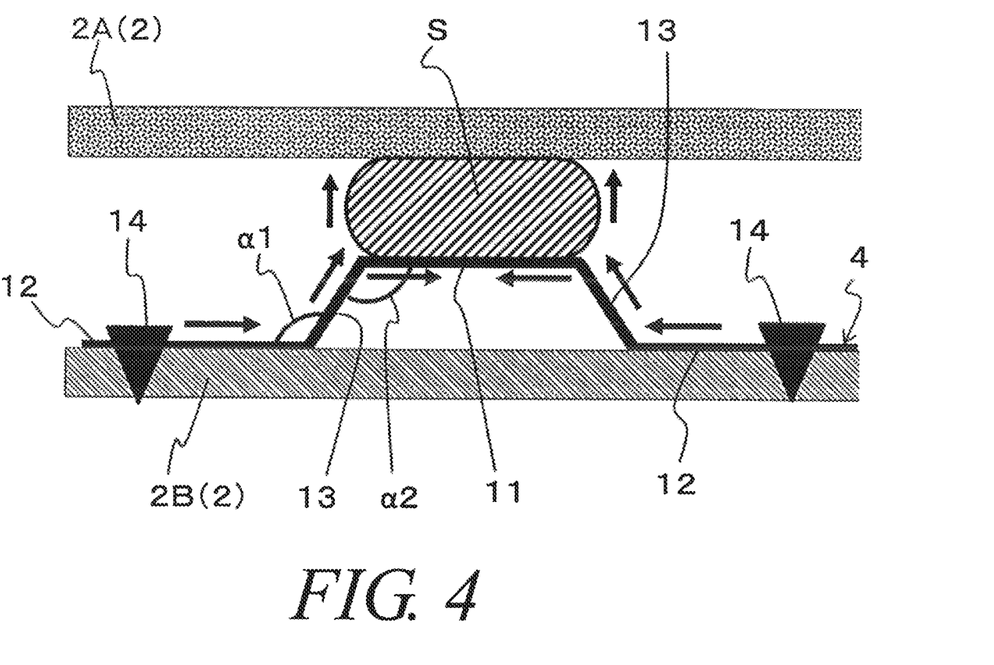
FIG. 4 is a cross-sectional view illustrating transmission of a reaction force that is produced around the sealing member.

In the fuel cell stack FS, reaction forces (resistant force) are produced in response to the above-described force transmission as illustrated in FIG. 4, and the reaction forces are transmitted to the respective connecting portions 13 from the both second contacting portions 12, 12 to act in the direction of compressing the sealing member S. Further, the reaction forces along the connecting portions 13 are also transmitted to the first contacting portion 11 and are then cancelled out at the first contacting portion 11.

In this way, in the fuel cell stack FS having the above-described configuration of the embodiment, the first contacting portion 11, the connecting portions 13, 13 and the second contacting portions 12, 12 with the fixing portions 14 maintain the protruded shape of the protruded shape portion with a top side composed of the first contacting portion 11 at the top between the frames 2, 2 of adjacent cell structures 3 so as to prevent the sealing member S from being directly subjected to a tensile force in the stacking direction or a shear force in the direction perpendicular to the stacking direction.

Therefore, the fuel cell stack FS can maintain the sealing function of the sealing members S even when the separators 4 are subjected to a load in the in-plane direction (direction parallel to the main surface) that is caused by pressure difference between the anode side and the cathode side or thermal deformation, since the separators 4 can be prevented from deformation due to the load.

In the fuel cell stack FS, since the angles α1 between each of the second contacting portions and the connecting portion have a measure of greater than 90 degrees, a force is suitably transmitted from the first contacting portion 11 to each of the second contacting portions 12 as illustrated in FIG. 3, and the reaction forces are suitably transmitted from the second contacting portions 12 to the first contacting portion 11 and cancelled out as illustrated in FIG. 4. Therefore, the protruded shape of the protruded shape portion of the separator 4 is maintained. Further, since the angles α1 are obtuse or have a measure of greater than 90 degrees, the separators 4 can be formed readily by press working.

In the fuel cell stack FS, the angles α1 between each of the second contacting portions 12 and the connecting portions 13, 13 have the same measure in degree. Therefore, the protruded shape is well-balanced between the right side and the left side, and deformation due to a load can be prevented more reliably.

In the fuel cell stack FS, the fixing portions 14 that fix the second contacting portions 12 to the frame 2 are formed by welding. Therefore, the function of preventing deformation can be achieved by a very simple structure. Further, this structure is suitable for mass production. The fixing portions 14 are not limited to welding. Depending on the material of the frames 2, the fixing portions 14 may be formed by brazing or by sealing members, adhesive or the like.

In the fuel cell stack FS, the separators 4, which is prevented from deformation, are formed by press working. This configuration is suitable for mass production and can contribute to a cost reduction and a decrease in thickness of the cell structures 3.

FIG. 5 to FIG. 10 illustrate fuel cell stacks according to second to sixth embodiments of the present invention. In the following embodiments, the same reference signs are denoted to the same components as those of the first embodiment, and the detailed description thereof is omitted.

Second Embodiment

Figure 5:
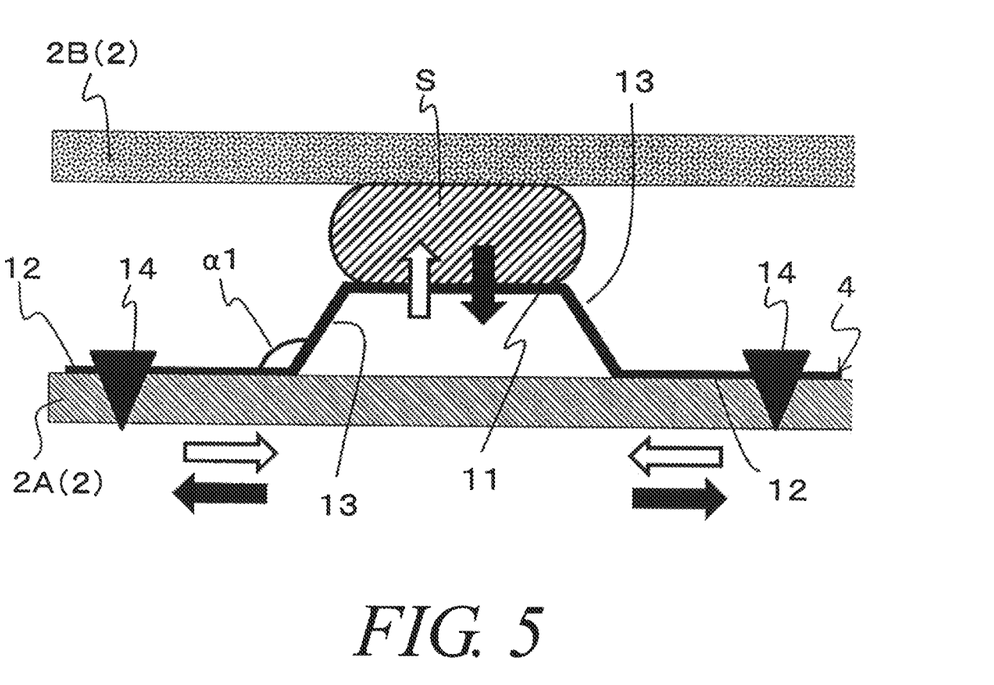
FIG. 5 is a cross-sectional view of a main part of a fuel cell stack according to a second embodiment.

A fuel cell stack FS in FIG. 5, which illustrates a main part thereof, has the same basic configuration as the previously-described embodiment. In the fuel cell stack FS, the materials are suitably selected for the frame 2 of a second cell structure 3 (lower cell structure 3 in the figure) of a first and a second cell structures 3, 3 disposed on opposite sides of each separator 4, i.e. the cell structure 3 in contact with second contacting portions 12, and the separators 4.

In the fuel cell stack FS, the linear expansion coefficient of the frame 2 of a second cell structure 3 is greater than the linear expansion coefficient of the separator 4. As described in the first embodiment (see FIG. 2), each frame 2 of this embodiment includes first and second frames 2A, 2B that are layered in the vertical direction. Accordingly, the linear expansion coefficient of at least the first frame 2A, which is on the side of the separator 4, is greater than the linear expansion coefficient of the separator 4. Sealing members S of the embodiment is made of a glass material.

Figure 6:
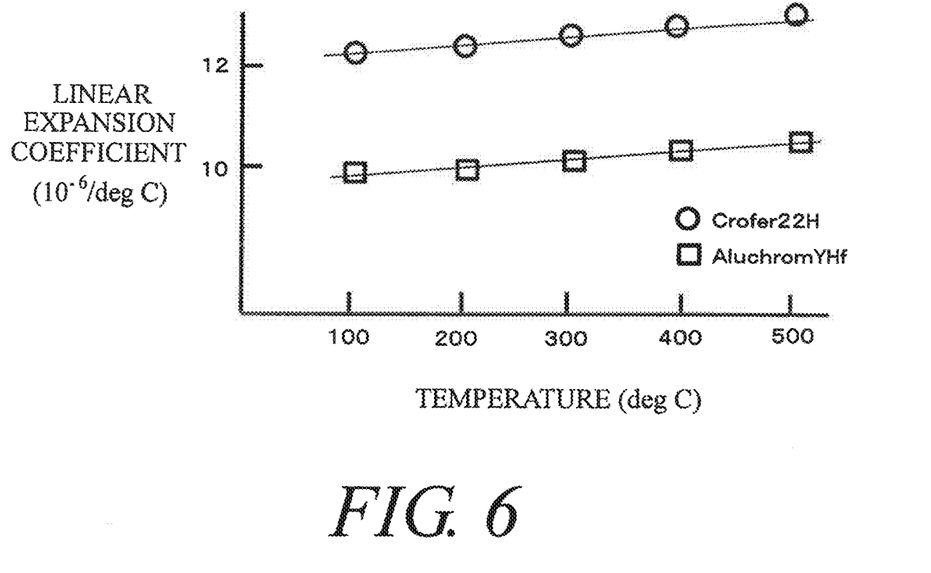
FIG. 6 is a graph illustrating the temperature characteristic of exemplary materials that can be used for frames and separators.

FIG. 6, which shows exemplary suitable materials, are graphs illustrating the change of linear expansion coefficient with changing temperature of "Crofer 22H (registered trademark)" used for the first frames 2A and "Aluchrom YHf (registered trademark)" used for the separators 4. These materials have a linear expansion coefficient that increases with an increase of temperature, and the respective approximate lines of the linear expansion coefficient are approximately parallel to each other. It is preferred that the first frames 2A and the separators 4, which are fixed to each other, are respectively made of materials that have approximately parallel approximate lines, i.e. materials that have small difference in linear expansion coefficient regardless of temperature change. Such materials are not limited to those exemplified in FIG. 6.

When the fuel cell stack FS becomes hot after operation is started, the sealing members S of a glass material become soft. Since the linear expansion coefficient of the first frames 2A is greater than the linear expansion coefficient of the separators 4, the first frames 2A expand in the in-plane direction as illustrated by the black arrows in FIG. 5. As a result, the separators 4 are subjected to a force in the direction of flattening the protruded shape of the protruded shape portion as illustrated by the black arrows so that the soft sealing members S are not excessively compressed. That is, in the fuel cell stack FS, if the sealing members S are compressed at high temperature and then the temperature falls after the operation is stopped, the sealing members S may be hardened in a compressed state to lose the sealing function. To avoid this, in the fuel cell stack FS, the sealing members S are prevented from excessive deformation at high temperature so as to maintain the sufficient sealing function.

In the fuel cell stack FS, when the temperature falls after the operation is stopped, the separators 4 shrink in the in-plane direction as illustrated by the white arrow in FIG. 5. As a result, the separators 4 are subjected to a force in the direction of increasing the height of the protruded shape as illustrated by the white arrow, and the sealing members S are held between the first contacting portions 11 and the frames 2 (second frames 2B) to maintain the sufficient sealing function.

As with the previously-described embodiment, even when the separators 4 are subjected to a load in the in-plane direction that is caused by pressure difference between the anode side and the cathode side or thermal deformation, the fuel cell stack FS of the embodiment can maintain the sealing function since the separators 4 maintain the protruded shape of the protruded shape portion and are prevented from deformation due to the load. Further, particularly since the linear expansion coefficient of the separators 4 is greater than the linear expansion coefficient of the frames 2 (first frames 2A), the fuel cell stack FS can always maintain the good sealing function of the sealing members S regardless of a temperature change due to start and stop of the operation.

Third Embodiment

Figure 7:
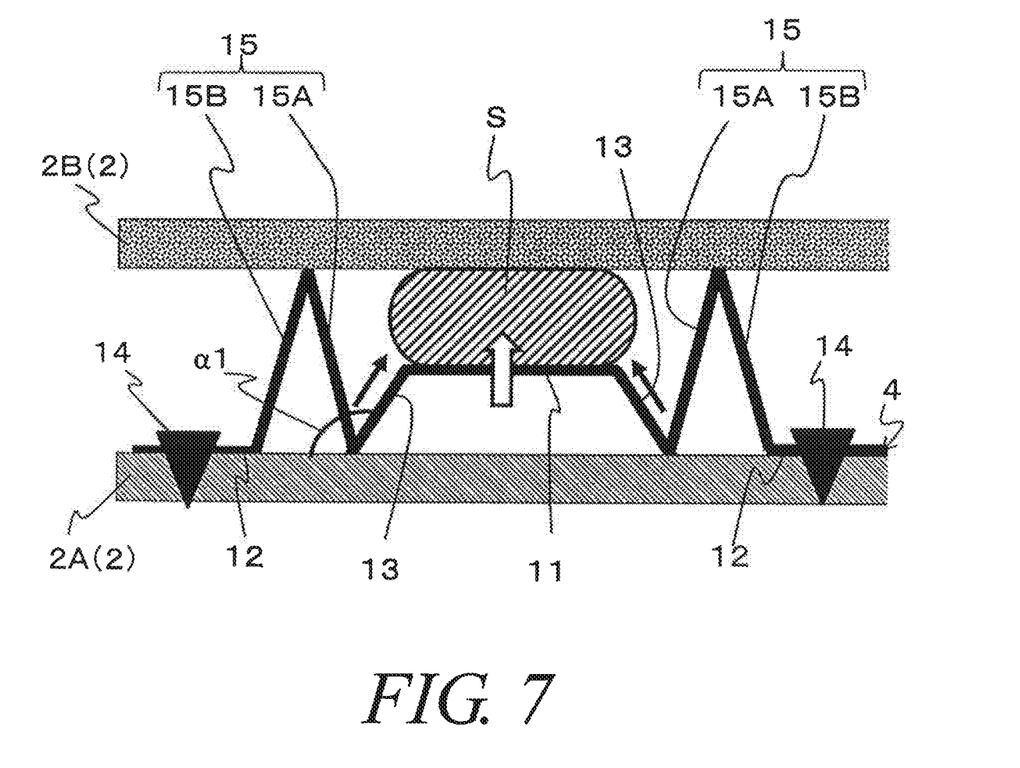
FIG. 7 is a cross-sectional view of a main part of a fuel cell stack according to a third embodiment.

A fuel cell stack FS in FIG. 7, which illustrates a main part thereof, has the same basic configuration as the previously-described embodiments. However, each separator 4 includes a bent portion 15 that is continuously formed between a connecting portion 13 and a second contacting portion 12 at least on one side to support facing frames 2, 2. In the illustrated embodiment, the bent portions 15 are formed between the connecting portions 13 and the second contacting portions 12 on both sides.

That is, in the fuel cell stack FS of the present invention, the angles $\alpha 1$ between each of the second contacting portions 12 and the connecting portions 13 have a measure of greater than 90 degrees. However, in the fuel cell stack FS of this embodiment, the bent portions 15 are present between the second contacting portions 12 and the connecting portions 13. That is, to be precise, the angles $\alpha 1$ between extensions of each of the second contacting portions 12 and the connecting portions 13 have a measure of greater than 90 degrees. In the fuel cell stack FS, the connecting portions 13 may directly continue to the second contacting portions 12 as in the first embodiment (see FIG. 2 and FIG. 3). Alternatively, the connecting portions 13 may indirectly continue to the second contacting portions 12 via the bent portions 15 as in this embodiment.

In the fuel cell stack FS of this embodiment, the angles $\alpha 1$ between each of the second contacting portions 12 and the connecting portions 13 can be substantially regarded as the angles $\alpha 1$ between the frames 2 and the connecting portions 13 since the second contacting portions 12 are located on the frames 2.

In a cross section transverse to the sealing members S, each of the bent portions 15 includes first and second inclined sides 15A, 15B that have approximately the same length. The first inclined side 15A extends from the lower end of the connecting portion 13 to the frame 2 (second frame 2B) of a first cell structure 3 (upper cell structure 3 in the figure). The second inclined side 15B extends from the upper end of the first inclined side 15A to the end of the second contacting portion 12. That is, the bent portion 15 forms an isosceles triangle with the frame 2.

As with the previously-described embodiments, since the fuel cell stack FS of this embodiment maintains the protruded shape of each protruded shape portion of each separator 4 between the frames 2, 2 of adjacent cell structures 3, the separators 4 are prevented from deformation due to a load caused by pressure difference or thermal deformation. Furthermore, in the fuel cell stack FS, the bent portion 15 of each separator 4 abuts the facing frames 2, 2 so as to support the frames 2, 2 and to maintain the gap between the frames 2, 2.

Therefore, the fuel cell stack FS has the same functions and effects as the previously-described embodiments. Furthermore, the fuel cell stack FS can maintain the good sealing function more reliably since the sealing members S are prevented from being directly subjected to a load while the separators 4 are prevented from deformation.

In the fuel cell stack FS, the first contacting portion 11, the connecting portions 13, the bent portions 15 and the second contacting portions 12 continue in a bent shape. This improves the mechanical strength of the portions of the separators 4 on which the sealing members S are disposed. As a result, in the fuel cell stack FS, deviation of sealing lines is prevented more reliably, which can contribute to a further improvement of the sealing function.

Fourth Embodiment

Figure 8:
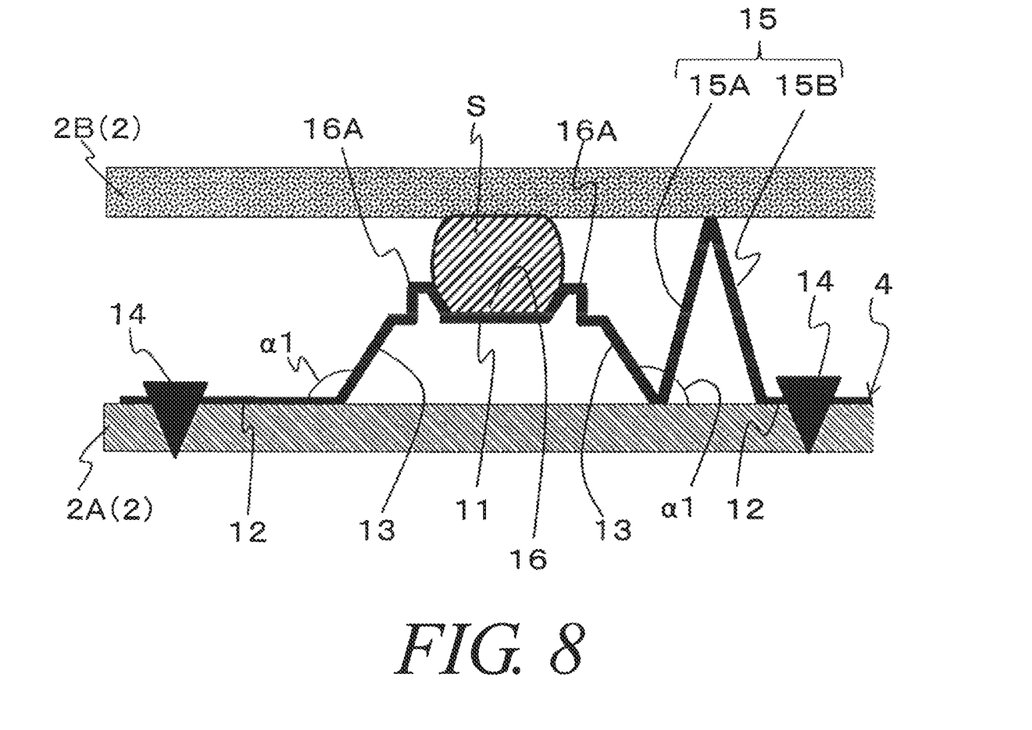
FIG. 8 is a cross-sectional view of a main part of a fuel cell stack according to a fourth embodiment.

A fuel cell stack FS in FIG. 8, which illustrates the main part thereof, has the same basic configuration as the previously-described embodiment. However, each first contacting portion 11 includes a groove 16 for holding a sealing member S in a cross section transverse to the sealing member S. That is, the groove 16 extends along the sealing member S. The groove 16 in the figure corresponds to a recess between protrusions 16A, 16A that are formed at both ends of the first contacting portion 11.

In the fuel cell stack FS, each separator 4 is configured such that a connecting portion 13 at one side (left side) in the figure directly continues to a second contacting portion 12, and another connecting portion 13 at the other side continues to another second contacting portion 12 via a bent portion 15.

In the fuel cell stack FS having the above-described configuration, the sealing members S are applied to the grooves 16, for example, when the sealing members S are made of a glass material, resin or the like, i.e. the sealing members S are applied and then hardened to acquire the sealing function. In the fuel cell stack FS, even when the sealing members S are softened by heat during operation, the grooves 16 prevent the sealing members S from leaking out to keep them in the grooves 16. Therefore, the fuel cell stack FS can maintain the sealing function.

The above-described fuel cell stack FS has the same functions and effects as the previously-described embodiments. Furthermore, since the first contacting portion 11 of the separator 4 has front and back sides with mutually inverted uneven patterns formed by the groove 16 and the protrusions 16A, 16A at both sides of the groove 16, the fuel cell stack FS has improved mechanical strength. This can prevent deviation of sealing lines and further improve the sealing function.

Fifth Embodiment

The first embodiment (see FIG. 2 and FIG. 3) is an example in which the connecting portions 13 and the second contacting portions 12 continue to form angles α1. In contrast, in an embodiment of a fuel cell stack FS in FIG. 9, which illustrates a main part thereof, connecting portions 13 are curved at the lower side, and the curved portions continue to second contacting portions 12.

In the fuel cell stack FS of the present invention, the angles α1 between each of the second contacting portions 12 and the connecting portions 13 have a measure of greater than 90 degrees. However, in the fuel cell stack FS of the embodiment, the lower ends of the connecting portions 13 are curved. That is, to be precise, the angles α1 between extensions (illustrated in an offset position in FIG. 9) of the linear parts of the connecting portions and the second contacting portions 12 have a measure of greater than 90 degrees.

Figure 9:
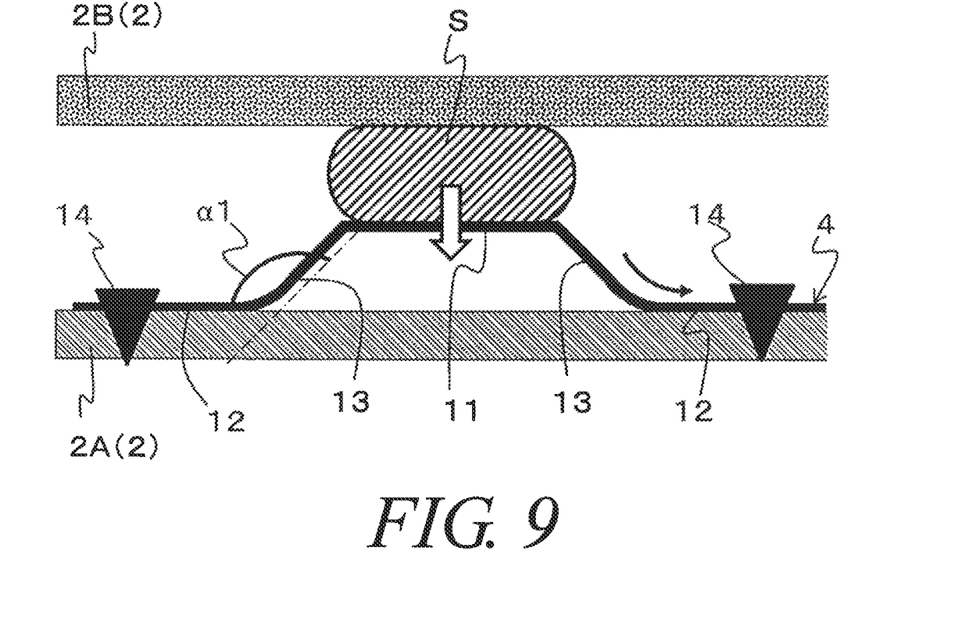
FIG. 9 is a cross-sectional view of a main part of a fuel cell stack according to a fifth embodiment.

In this fuel cell stack FS, for example, when a force in the compressing direction is produced in an interlayer as illustrated by the bold arrow in FIG. 9, the force is transmitted to the second contacting portions 12 via the connecting portions 13 as illustrated by the thin arrow at the right, but the protruded shape of the protruded shape portion is maintained since the second contacting portions 12 are fixed on frames 2 by fixing portions 14 as with the previously-described embodiments. Further, in the fuel cell stack FS, since the connecting portions 13 continue to the second contacting portions 12 via curved portions, a force applied to the first contacting portions 11 are smoothly transmitted to the second contacting portions 12 along the curved portions.

As with the previously-described embodiments, the sealing members S are prevented from being directly subjected to a load while deformation of the separators 4 are prevented. Therefore, the fuel cell stack FS can maintain good sealing function more reliably.

Sixth Embodiment

Figure 10:
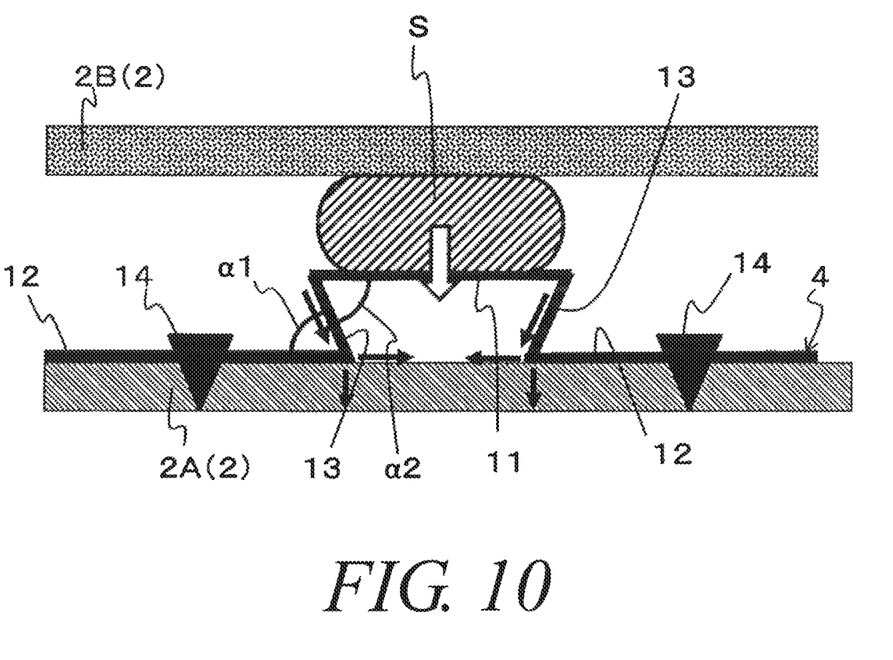
FIG. 10 is a cross-sectional view of a main part of a fuel cell stack according to a sixth embodiment.

A fuel cell stack FS in FIG. 10, which illustrates a main part thereof, has the same basic configuration as the previously-described embodiments. However, in each separator 4, the angles α1 between each of second contacting portions 12, 12 and connecting portions 13, 13 have a measure of less than 90 degrees. Accordingly, in each separator 4, a protruded shape portion that has an inverted trapezoid shape with a top side composed of a first contacting portion 11 at the top is formed.

In each separator 4, since the first contacting portion 11 is substantially parallel to the second contacting portions 12, the angles α2 between the first contacting portion 11 and connecting portions 13 have a measure of less than 90 degrees. The angles α1, α2 have the same measure in degree between both sides of the first contacting portion 11.

For example, when the fuel cell stack FS having the above-described configuration is subjected to a compressing load in the stacking direction as illustrated by the bold arrow in FIG. 10, downward forces inclined along the connecting portions 13 are generated as illustrated by thin arrows in FIG. 10. The generated force is divided into a force vertically downward from the protruded shape portion and a force toward the center of the protruded shape portion. The reaction forces (resistant forces) act in the opposite directions of the respective arrows.

In the fuel cell stack FS, the second contacting portions 12 remain in the same position even in this condition since the second contacting portions 12 are fixed on frames 2 by fixing portions 14. Further, the forces respectively from the left and the right to the center of the protruded shape portion are cancelled out. As a result, the protruded shape of each protruded portion of the separator 4 is maintained. In this way, the fuel cell stack FS can maintain good sealing function more reliably as with the previously-described embodiments, since the sealing members S are prevented from being directly subjected to a load while deformation of the separators 4 are prevented.

In the first to fifth embodiments, the angles α1 between the second contacting portions 12 and the connecting portions 13 have a measure of greater than 90 degrees. In contrast, in the sixth embodiment, the angles α1 between the second contacting portions 12 and the connecting portions 13 have a measure of less than 90 degrees. In the fuel cell stack FS of the present invention, the angles α1 between the second contacting portions 12 and the connecting portions 13 may have a measure of 90 degrees.

In this fuel cell stack FS, a downward force acting on the connecting portions 13 are directly transmitted to the frames 2, and the second contacting portions 12 are prevented from deformation by the fixing portions 14. Accordingly, the protruded shape of each protruded shape portion of the separators 4 is maintained. In this way, the fuel cell stack FS can maintain good sealing function more reliably since the sealing members S are prevented from being directly subjected to a load while deformation of the separators 4 are prevented.

The configuration of the fuel cell stack of the present invention is not limited to the above described embodiments. Suitable changes can be made in the detailed configuration without departing from the features of the present invention. Further, the configurations of the above-described embodiments can be suitably combined.

REFERENCE SIGNS LIST

FS Fuel cell stack
S Sealing member
1 Power generation area
2 Frame
3 Cell structure
4 Separator
11 First contacting portion
12 Second contacting portion
13 Connecting portion
14 Fixing portion
15 Bent portion
16 Groove

The invention claimed is:

1. A fuel cell stack, comprising:
a first cell structure including a power generation area and a frame disposed around the power generation area;
a second cell structure including a power generation area and a frame disposed around the power generation area; and
a plurality of separators,
wherein the first and second cell structures, and the separators, are alternately stacked, such that the first cell structure is disposed on a first side of one of the separators and the second cell structure is disposed on a second side of the one of the separators,
wherein the fuel cell stack further comprises a sealing member that seals a gap between a peripheral portion of the frame of the first cell structure and a peripheral portion of the one of the separators, and
the one of the separators includes:
a first contacting portion in contact with the sealing member;
a plurality of second contacting portions in contact with the frame of the second cell structure, wherein a first of the plurality of the second contacting portions is disposed at a first side of the first contacting portion and a second of the plurality of the second contacting portions is disposed at a second side of the first contacting portion; and
a plurality of connecting portions that respectively connect the plurality of second contacting portions to the first contacting portion,
wherein the first contacting portion, the plurality of second contacting portions, and the plurality of connecting portions form a protruded shape portion with a top side comprising the first contacting portion in a cross section transverse to the sealing member, and each of the second contacting portions comprises a respective fixing portion that fixes the second contacting portion and the frame of the second cell structure.

2. The fuel cell stack according to claim 1, wherein angles between each of the second contacting portions and the corresponding connecting portions are greater than 90 degrees.

3. The fuel cell stack according to claim 1, wherein angles between each of the second contacting portions and the corresponding connecting portions are a same number of degrees.

4. The fuel cell stack according to claim 2, wherein the angles between each of the second contacting portions and the corresponding connecting portions are a same number of degrees.

5. The fuel cell stack according to claim 1, wherein a linear expansion coefficient of the frame of the second cell structure is greater than a linear expansion coefficient of the separators.

6. The fuel cell stack according to claim 1, wherein the fixing portion of each of the second contacting portions is a welded portion that welds the second contacting portion and the frame of the second cell structure.

7. The fuel cell stack according to claim 1, wherein each of the separators comprises a bent portion that is continuously disposed between at least one of the connecting portions and at least one of the second contacting portions to support the frames that are opposed to each other.

8. The fuel cell stack according to claim 1, wherein the first contacting portion comprises a groove that holds the sealing member.

* * * * *